Jan. 15, 1924.                                   1,480,969
D. THOMSON
DISINTEGRATING SOLID SUBSTANCES
Filed July 27, 1923

INVENTOR
David Thomson,
BY
Watson, Coit,
Morse & Grindle
ATTYS

Patented Jan. 15, 1924.

1,480,969

UNITED STATES PATENT OFFICE.

DAVID THOMSON, OF LONDON, ENGLAND, ASSIGNOR TO NUTRIMENT LIMITED, OF LONDON, ENGLAND, A BRITISH COMPANY.

DISINTEGRATING SOLID SUBSTANCES.

Application filed July 27, 1923. Serial No. 654,236.

*To all whom it may concern:*

Be it known that I, (Dr.) DAVID THOMSON, a subject of the King of England, residing at London, in England, have invented certain new and useful Improvements in Disintegrating Solid Substances, of which the following is a specification.

This invention is for an improved method of and means for disintegrating solid substances, such, for example, as mincing meat, various proteins, or other solid materials into a very fine state of subdivision. For example, in the preparation of meat juices or beef-tea, it is desirable that the meat should be disintegrated into as fine a state as possible in a fluid such as water, and this invention provides an improved method of effecting this disintegration, and an improved machine whereby the disintegration is more effectively performed than has hitherto been possible.

This invention accordingly comprises the method of disintegrating solid substances, consisting in grinding the substance against a plate that is perforated with small holes, and is immersed in a fluid, and withdrawing the disintegrated substance in suspension in the fluid after it has passed through the perforations in the plate aforesaid.

This invention also provides a machine for carrying out the method above described, the machine comprising a chamber, a plate perforated with small holes and spaced away from the bottom of the chamber, a grinding member which is rotatable in contact with the upper surface of the plate, and means for maintaining a liquid in the chamber at a substantially constant depth sufficient to submerge the plate and grinding member.

According to another feature of this invention the rotatable member aforesaid may be shaped similarly to a propeller, or otherwise have its leading edge in the direction of rotation inclined upwardly away from the perforated plate, so that it exerts a wedging action on the material to feed it towards and press it on the perforated plate.

In the accompanying drawings which illustate one embodiment of this invention—

Like reference characters indicate like parts in both figures.

Figure 1:
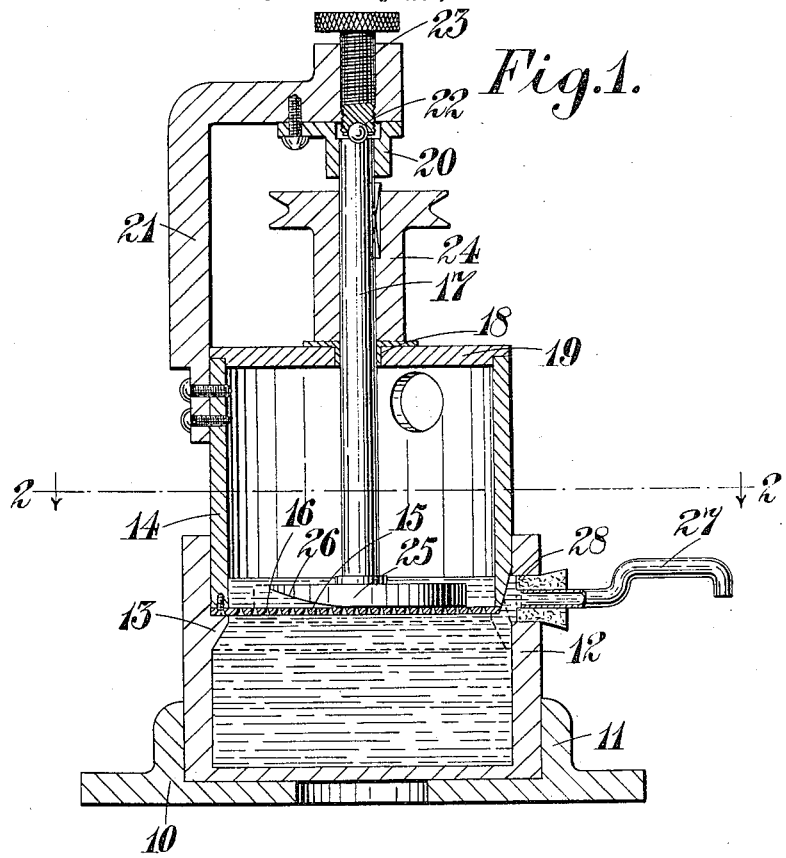
Figure 1 is a central sectional elevation of the complete machine.

Referring to these drawings, the machine comprises a base plate 10 which may be arranged, if desired, to be bolted down to a table or bench, and which is provided with an upstanding flange 11, or is otherwise shaped to receive a hollow cylindrical vessel 12. At a convenient height in this vessel there is formed an inwardly directed ridge 13 to form a shoulder whereon is seated an upper cylindrical vessel 14. The bottom of this vessel 14 is constituted by a steel plate 15 which is perforated with a large number of small holes 16. These holes are tapered with their smaller ends uppermost and are of any convenient small size; a size which has been found suitable in practice being of the order of 1/25" in diameter.

A vertical shaft 17 is disposed centrally in the upper vessel 14, being located in a central bearing 18 in the cover 19 of the vessel 14, and also by another bearing 20 carried on any convenient bracket 21. A thrust-bearing is also provided at the upper end of this shaft to receive any vertical thrust on it, and this bearing is conveniently constituted by a ball 22 bearing centrally against the end of the shaft 17 and being itself located by means of a set-screw 23 in the bracket 21. This shaft also carries a pulley 24 for a belt-drive, or any other convenient means for imparting a drive to the shaft. At the lower end of the shaft which extends downwards closely to the plate 15 aforesaid there is mounted a propeller-like member 25 which is held in contact with the plate. As shown most clearly in Figure 2, this member 25 comprises two vanes, and the leading-edge of each, in the direction of rotation, is inclined upwardly, as shown at 26 in Figure 1, away from the plate 15. The member 25 is of such diameter that it sweeps over the whole of the plate 15 during its rotation.

Figure 2:
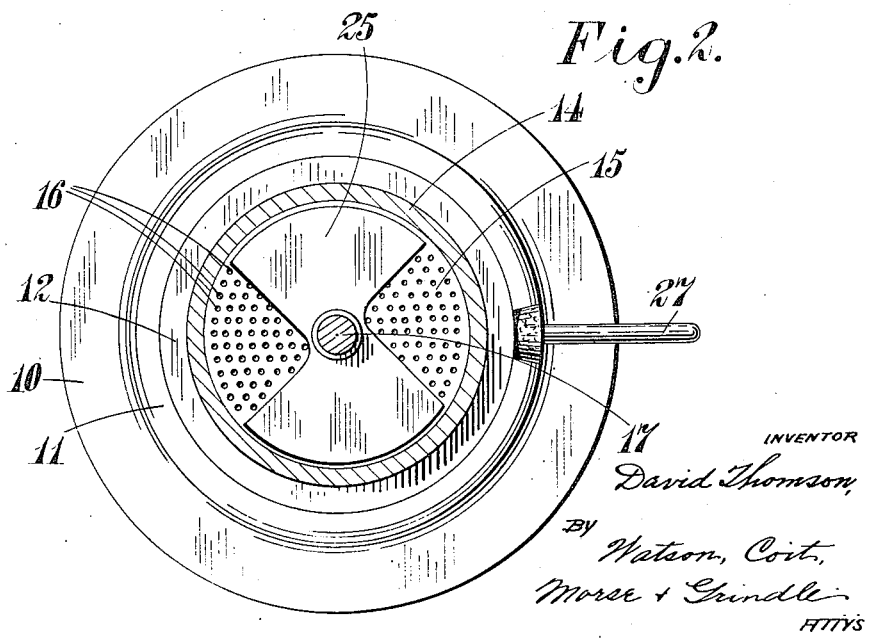
Figure 2 is a plan in section on the line 2—2 of Figure 1.

An overflow pipe 27 communicates with the interior of the vessel 12 below the perforated plate 15. As illustrated in Figure 1, a slot or channel is formed in the ridge 13 to communicate with an opening 28 in the wall of the vessel 12 into which the pipe 27 is inserted. Obviously, however, this overflow pipe could be inserted in the vessel 12 below the level of the ridge 13. The overflow pipe is bent upwardly to a height slightly above the upper surface of the propeller-member 25.

In the operation of this device, the two vessels are filled with water to the height determined by the overflow pipe 27, so that the propeller 25 is submerged to a depth, say, of ¼", and the meat or other material which is to be disintegrated is placed in the upper vessel 14, and the shaft 17 and propeller 25 are then set in rotation; the leading-edges 26 of the propeller entrap the solid material beneath it so as to grind it against the plate 15, sweeping it along the surface thereof, so that it is cut or shaved at the edges of the holes 16. The presence of the water or other fluid washing both surfaces of the plate 15 prevents the holes 16 from becoming clogged and maintains the disintegrated material in suspension so that it falls through the holes into the lower chamber. The continuous supply of the meat or other material gradually displaces the liquid from the bottom chamber 12 so that it is discharged through the overflow pipe 27 and it carries with it in suspension the finely disintegrated material. Additional liquid is added as is necessary to maintain the desired proportion of solid and liquid, but it will be appreciated that the continuous flow of the liquid through the overflow pipe 27 ensures that the layer of liquid above the perforated plate remains substantially at the same level throughout the operation, or in other words, that the depth of submergence of the perforated plate is constant. This is of importance because if the depth of liquid above the plate 15 were allowed to become too great, there would be a tendency for the solid material to flow upwards above the propeller 25 so that it would not undergo the desired treatment. On the other hand, if the level of the liquid should fall below the perforated plate 15, the holes 16 would rapidly become choked with disintegrated material.

It is obvious that the machine may be constructed as to its mechanical details in various ways and the invention is not limited, except as hereinbefore described, to any particular details of construction.

What I claim as my invention and desire to secure by Letters Patent is:—

1. The method of disintegrating solid substances consisting in grinding the substance against a plate that is perforated with small holes and is immersed in a fluid, and withdrawing the disintegrated substance in suspension in the fluid after it has passed through the perforations in the plate.

2. The method of disintegrating solid substances consisting in grinding the substance by means of a propeller-like member against a plate that is perforated with small holes, the said parts being immersed in a fluid, maintaining the level of the fluid closely above the propeller-like member, and withdrawing the disintegrated substance in suspension in the fluid after it has passed through the perforations in the plate.

3. A machine for disintegrating solid substances comprising a chamber, a plate perforated with small holes and spaced away from the bottom of the chamber, a grinding member rotatable in contact with the upper surface of said plate, and means for maintaining a liquid in the chamber at a substantially constant depth sufficient to submerge the plate and grinding member.

4. A machine for disintegrating solid substances comprising a chamber, a perforated plate spaced from the bottom of the chamber, a second plate rotatable in contact with the upper surface of said perforated plate, said second plate comprising a plurality of sectors, each having its leading marginal edge inclined upwardly from the perforated plate, and means for maintaining a liquid in the chamber at a substantially constant depth sufficient to submerge the perforated plate and the rotatable plate.

In testimony whereof I affix my signature.

DAVID THOMSON.